P. R. ZIECHE.
TRACTOR.
APPLICATION FILED AUG. 19, 1918. RENEWED APR. 17, 1922.
1,426,699.
Patented Aug. 22, 1922.
2 SHEETS—SHEET 1.
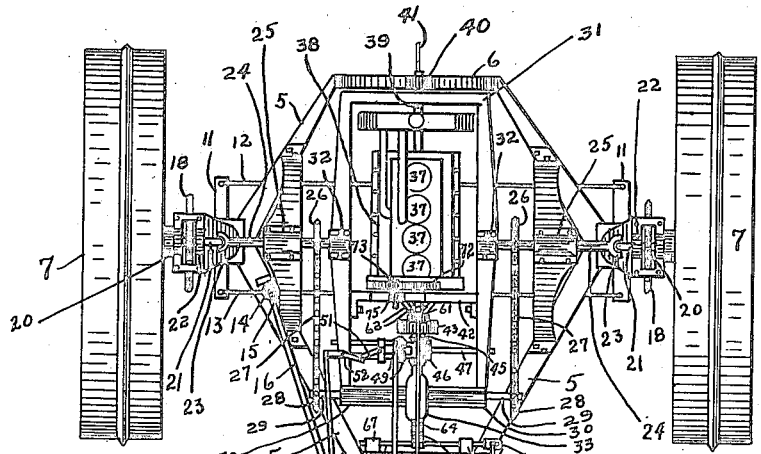
FIG. 1
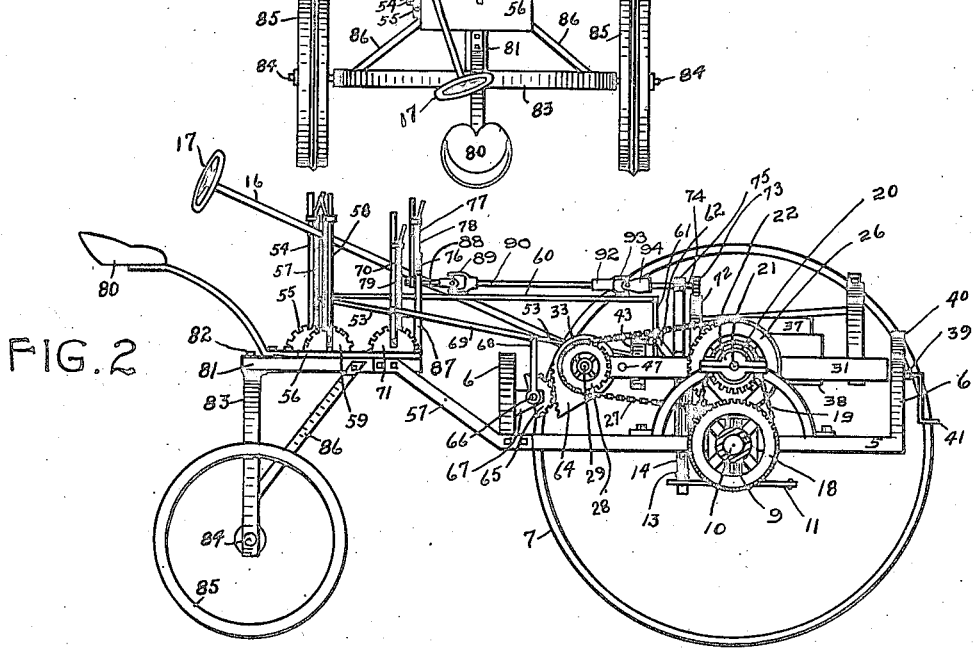
FIG. 2
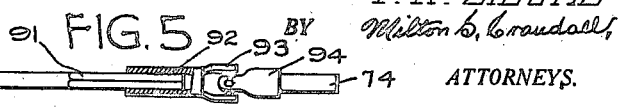
FIG. 5
INVENTOR.
P. R. ZIECHE
BY Milton C. Crandall,
ATTORNEYS.

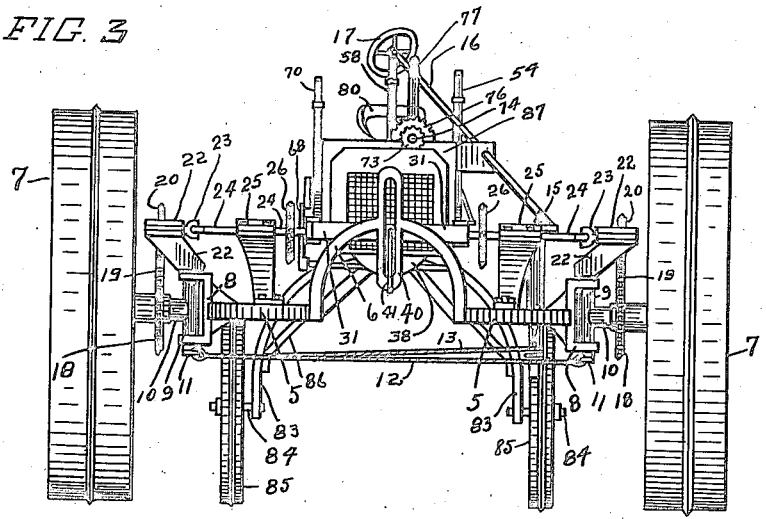

UNITED STATES PATENT OFFICE.

PAUL R. ZIECHE, OF MOVILLE TOWNSHIP, WOODBURY COUNTY, IOWA.

TRACTOR.

1,426,699.  Specification of Letters Patent.  Patented Aug. 22, 1922.

Application filed August 19, 1918, Serial No. 250,464. Renewed April 17, 1922. Serial No. 553,924.

*To all whom it may concern:*

Be it known that I, PAUL R. ZIECHE, a citizen of the United States, and a resident of Moville Township, in the county of Woodbury and State of Iowa, have invented certain new and useful Improvements in Tractors, of which the following is a specification.

This invention aims primarily to produce a motor vehicle including an improved dirigible drive truck.

Another object of the invention is the production of a motor vehicle including certain novel features of construction particularly adapting it as a tractor.

Still another object of the invention is the production of a motor vehicle so constructed that the engine may be maintained in a level position, regardless of the inclination of the vehicle, to insure uniform cylinder lubrication and highest motor efficiency.

Furthermore, the invention contemplates an improved tractor including a single truck adapted to be readily coupled to a vehicle or implement which it may be desired to pull.

With these and other objects in view, the invention consisting in the construction, combination and novel arrangement of parts will be fully understood from the following description, reference being had to the accompanying drawings which form a part of this application and in which like characters of reference indicate corresponding parts throughout the several views, of which, Figure 1 is a plan of a tractor constructed in accordance with the invention;

Fig. 2 is a side elevation of the same with one of the traction wheels removed;

Fig. 3 is a front elevation of the same;

Fig. 4 is an enlarged plan of the power transmission and associated parts; and

Fig. 5 is an enlarged fragmentary elevation of one of the controlling shafts.

Although I have illustrated and hereinafter described the preferred embodiment of the invention, I would not be understood as being limited to the specific structure chosen for illustration, for various alterations and modifications may be made in the details of construction and arrangement of parts without departing from the spirit and scope of the invention as defined in the appended claims.

The machine consists of a suitable main frame which may include side members, 5, interconnected at their front and rear ends by arches, 6. The frame is carried by dirigible drive wheels, 7, the frame being mounted on said wheels by means of knuckles including yokes, 8, on the frame members 5, and between the arms of which are rotatably mounted shafts, 9, having lateral spindles, 10, on which the wheels, 7, rotate. The shafts, 9, at their lower ends are each provided with oppositely disposed arms, 11, the forwardly disposed arms being interconnected by a link, 12, and the rearwardly disposed arms being interconnected by a flexible link, 13, having a bight thereof wound on an upright shaft, 14, rotatably supported by the main-frame and actuated by a worm, 15, on a steering shaft, 16, suitably journaled on the frame and provided with a steering-wheel, 17. The wheels, 7, have fixed on their hubs, sprocket-wheels, 18, connected by sprocket-chains, 19, with sprocket-wheels, 20, mounted on stub shafts, 21, journaled in suitable bearings, 22, carried by the upper ends of the knuckle-shafts, 9; and connected by universal joints 23, with shafts, 24, journaled in suitable bearings, 25, carried by the frame members, 5; and carrying sprocket-wheels, 26, driven by sprocket chains, 27, from sprocket-wheels, 28, mounted on the respective ends of a shaft, 29, journaled in a housing, 30, on the rear of a secondary frame, 31, the intermediate portions of which are provided with bearings, 32, which inclose the shafts, 24, whereby the said frame, 31, may oscillate on the shafts, 24, in a vertical plane longitudinally of the machine. Through the medium of any suitable form of differential gearing, 33, the shaft 29, is actuated by a drive shaft, 34, journaled in a bearing, 35, carried by the housing, 30; and having a beveled drive pinion, 36, adapted to be driven by any preferred form of power transmission.

An internal combustion engine is provided including cylinders 37, and a crankcase, 38, through which extends a crankshaft, 39, the front end of said shaft being journaled in the front cross member of the frame, 31, and free to move vertically in an upright slotted member, 40, formed in the front arch, 6, of the main frame. The shaft is provided at its front end with the usual starting-crank, 41. The rear end of the crank-shaft is journaled in a cross-member, 42, of the secondary frame. Thus the engine is capable of oscillating in a vertical plane transversely of the machine. The crank shaft is operatively connected with a drive-pinion, 36, through any preferred type of power transmission, which in the embodiment illustrated consists of a free clutch member, 43, on the crank-shaft and a fixed clutch member, 44, slidable on the crank-shaft to engage and disengage with and from the free clutch-member. The free clutch-member carries a beveled-pinion, 45, engaged by and intermeshed with a beveled gear, 46, rotating on the shank of a forked shaft, 47, slidable transversely on the secondary frame to engage and disengage the said gear with and from the pinions, 45 and 36. The arms, 48, of the shaft, 47, carry intermeshed spur-gears, 49, having beveled teeth engageable with the pinions, 45, and 36, to drive the pinion, 36, in the opposite direction to which it is driven by the gear, 46. When the shaft is shifted to an intermediate position it is clear that the transmission will be neutral and the pinion, 36, inactive. The shaft, 47, may be controlled by means of a yoke, 50, connecting the arms, 48, and connected by a link, 51, with one arm of a bell-crank, 52, fulcrumed on the frame, 31, and the other arm thereof is connected by a link, 53, with a lever, 54, fulcrumed on a quadrant, 55, mounted on a platform, 56, and engageable by a suitable detent, 57, on the lever. The platform, 56, is mounted on bracket arms, 57, inclined rearwardly from the main frame. The clutch is controlled by means of a lever, 58, fulcrumed on a quadrant, 59, mounted on the platform, 56, the said lever, 58, being connected by a link, 60, with one end of a lever, 61, fulcrumed between arms, 62, on the cross member, 42; and the opposite end of the lever, 61, is engaged with an annularly-grooved hub, 63, on the slidable clutch member. Thus by forward and rearward movement of the lever 58, the clutch member, 44, is accordingly disengaged and engaged from and with its companion.

On the rear of the secondary frame is mounted a toothed segment, 64, intermeshed with a toothed segment, 65, mounted on a shaft, 66, journaled in bearings, 67, on the rear of the main frame. The shaft, 66, carries a crank arm, 68, connected by a link, 69, with a lever, 70, fulcrumed on a quadrant, 71, mounted on the platform, 56, the said lever being provided with a suitable detent, 79, engageable with the quadrant, 71.

By virtue of this construction it is clear that the secondary frame will be oscillated in a vertical plane longitudinally of the machine, by oscillation of the lever, 70. On the rear of the motor and transversely thereof, is mounted a toothed segment, 72, intermeshed with a pinion, 73, carried by a shaft, 74, journaled in a bearing, 75, on the cross member, 42. Suitable means are provided for rocking the spindle to tilt the motor laterally, and yet not prevent swinging of the frame, 31. The said means may consist of a hand-lever, 77, fixed on a stub shaft, 88, journaled in a quadrant, 76, mounted on the dash, 87, carried by the platform, 56. The stub shaft 88, is connected by a universal joint, 89, with one end of a shaft, 90, the opposite end of which is flat-sided, as at 91, and has slidably mounted thereon the elongated shank, 92, of a universal joint member, 93, the companion, 94, of which is mounted on the spindle, 74. By rocking the spindle 74, through the medium of the above-described flexible and extensible actuating means, it is clear that the motor will be rocked laterally. Upon the platform, 56, is mounted a driver's seat, 80, from which the driver can conveniently steer the machine and operate the controlling levers.

The platform, 56, is mounted on a truck including a central longitudinally disposed member, 81, on which the platform is mounted, said member being extended rearwardly from the platform and bolted as at, 82, to an arched axle, 83, provided with spindles, 84, upon which rotate travel wheels, 85; diagonal braces 86, between the longitudinal member, 81, and the axle prevent forward and rearward movement of the latter with respect to the platform; or if it is so desired the arched axle and associated parts may be removed from the longitudinal member, 81, and said member, 81, suitably mounted on a vehicle or implement which it may be desired to pull, and support the platform.

It is now clear that the motor, regardless of its inclination in either direction will operate the drive-wheels, 7, either forwardly or rearwardly and not interfere with steering the travel wheels. When ascending or descending a hill the motor may be leveled by tilting the secondary frame through the medium of the lever, 70, to level the oil within the crank-case and thus insure uniform lubrication of the cylinders; and when on a side hill or when one of the travel wheels, 7, is in a furrow or ditch the engine may be tilted laterally to a level position through the medium of the lever, 77.

Having thus described my invention, what I claim as new and desire to secure by Letters Patent of the United States, is,—

1. In a motor-vehicle, a main-frame, traction-wheels, a motor, driving connections between the motor and traction-wheels the motor being so supported by the main-frame that it may be tilted either laterally or longitudinally, with respect to the main-frame, and means for tilting and preventing tilting of the motor.

2. In a motor-vehicle, a main-frame, traction-wheels, a second frame pivoted on the main-frame to oscillate in a vertical plane, a motor pivotally supported by the second frame to oscillate at right angles to the plane in which the second frame oscillates, driving connections between the motor and traction wheels, and means for oscillating and holding said second frame and the motor.

3. In a motor-vehicle, a main-frame, traction-wheels, a second frame pivoted on the main-frame to oscillate in a vertical plane longitudinally of the main-frame, a motor pivoted on the second frame to oscillate in a vertical plane transversely of the main-frame, driving connections between the motor and wheels and means for oscillating and holding said second frame and the motor.

In testimony whereof, I have hereunto set my hand this 13th day of August, 1918.

PAUL R. ZIECHE.